United States Patent
Lin

(10) Patent No.: US 12,408,182 B2
(45) Date of Patent: Sep. 2, 2025

(54) APPARATUS AND METHOD OF WIRELESS COMMUNICATION

(71) Applicant: GUANGDONG OPPO MOBILE TELECOMMUNICATIONS CORP., LTD., Dongguan (CN)

(72) Inventor: Hao Lin, Neuilly-sur-Seine (FR)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 397 days.

(21) Appl. No.: 18/145,987

(22) Filed: Dec. 23, 2022

(65) Prior Publication Data

US 2023/0140467 A1    May 4, 2023

Related U.S. Application Data

(63) Continuation of application No. PCT/IB2021/059502, filed on Oct. 15, 2021.

(30) Foreign Application Priority Data

Oct. 16, 2020   (WO) .................. PCT/IB2020/000890

(51) Int. Cl.
*H04W 72/232*  (2023.01)
*H04L 1/1829*  (2023.01)
*H04W 72/1273*  (2023.01)

(52) U.S. Cl.
CPC ......... *H04W 72/232* (2023.01); *H04L 1/1854* (2013.01); *H04L 1/1861* (2013.01); *H04W 72/1273* (2013.01)

(58) Field of Classification Search
CPC ............ H04W 72/232; H04W 72/1273; H04L 1/1854; H04L 1/1861
See application file for complete search history.

(56) References Cited

U.S. PATENT DOCUMENTS

| | | |
|---|---|---|
| 2018/0019843 A1 | 1/2018 | Papasakellariou |
| 2020/0127771 A1 | 4/2020 | Papasakellariou |
| 2020/0127772 A1 | 4/2020 | Papasakellariou |

(Continued)

FOREIGN PATENT DOCUMENTS

| | | |
|---|---|---|
| EP | 3832938 A1 | 6/2021 |
| WO | 2018145074 A1 | 8/2018 |

(Continued)

OTHER PUBLICATIONS

Intel Corporation. "Discussion on Required Changes to NR in 52.6-71 GHz" 3GPP TSG RAN WG1 Meeting #102-e R1-2006986 e-Meeting, Aug. 17-28, 2020—24 pages.

(Continued)

*Primary Examiner* — Kent Krueger
(74) *Attorney, Agent, or Firm* — PERKINS COIE LLP

(57) ABSTRACT

An apparatus and a method of wireless communication are provided. The method by a user equipment (UE) includes being configured, by abase station, with a downlink control information (DCI) scheduling physical downlink shared channels (PDSCHs) and indicating a number of the PDSCHs. This can solve issues in the prior art, reduce a signaling overhead, provide a method for multiple PDSCH scheduling, provide a good communication performance, and/or provide high reliability.

20 Claims, 2 Drawing Sheets

(56) References Cited

U.S. PATENT DOCUMENTS

| | | |
|---|---|---|
| 2020/0127773 A1 | 4/2020 | Papasakellariou |
| 2020/0127796 A1 | 4/2020 | Li |
| 2021/0184803 A1 | 6/2021 | Ge et al. |
| 2021/0273749 A1 | 9/2021 | Papasakellariou |
| 2022/0174667 A1* | 6/2022 | Lei .................. H04L 5/0094 |
| 2022/0271873 A1* | 8/2022 | Gao .................. H04L 1/1854 |

FOREIGN PATENT DOCUMENTS

| | | |
|---|---|---|
| WO | 2020048364 A1 | 3/2020 |
| WO | 2020198947 A1 | 10/2020 |

OTHER PUBLICATIONS

International Search Report in the international application No. PCT/IB2021/059502, mailed on Feb. 1, 2022—4 pages.

Written Opinion of the International Search Authority in the international application No. PCT/IB2021/059502, mailed on Feb. 1, 2022—8 pages.

* cited by examiner

APPARATUS AND METHOD OF WIRELESS COMMUNICATION

CROSS-REFERENCE TO RELATED APPLICATION(S)

This application is a continuation of International Patent Application No. PCT/IB2021/059502 filed on Oct. 15, 2021, which claims the priority to International Patent Application No. PCT/IB2020/000890 filed on Oct. 16, 2020. The entire contents of the prior applications are incorporated by reference herein in their entirety.

BACKGROUND OF DISCLOSURE

1. Field of the Disclosure

The present disclosure relates to the field of communication systems, and more particularly, to an apparatus and a method of wireless communication, which can provide a good communication performance and/or high reliability.

2. Description of the Related Art

In an unlicensed band, an unlicensed spectrum is a shared spectrum. Communication equipment in different communication systems can use the unlicensed spectrum as long as the unlicensed meets regulatory requirements set by countries or regions on a spectrum. There is no need to apply for a proprietary spectrum authorization from a government.

In order to allow various communication systems that use the unlicensed spectrum for wireless communication to coexist friendly in the spectrum, some countries or regions specify regulatory requirements that must be met to use the unlicensed spectrum. For example, a communication device follows a listen before talk (LBT) or channel access procedure, that is, the communication device needs to perform a channel sensing before transmitting a signal on a channel. When an LBT outcome illustrates that the channel is idle, the communication device can perform signal transmission; otherwise, the communication device cannot perform signal transmission. In order to ensure fairness, once a communication device successfully occupies the channel, a transmission duration cannot exceed a maximum channel occupancy time (MCOT). LBT mechanism is also called a channel access procedure. In new radio (NR) Release 16, there are different types of channel access procedures, e.g., type 1, type 2A, type 2B and type 2C channel access procedures as described in TS 37.213.

In Release (Rel.) 15 and Rel. 16 of new radio (NR) system, a resource allocation for downlink data such as physical downlink shared channel (PDSCH) has been specified in TS 38.214 section 5. A PDSCH may be scheduled by a downlink control information (DCI) format. The PDSCH contains a transport block corresponding to a hybrid automatic repeat request (HARQ) process number. However, in some cases, e.g., high throughput requested application such as virtual reality (VR)/augmented reality (AR), or non-terrestrial communications as described in TR 38.811 or TS 38.821, a user equipment (UE) needs to receive PDSCHs carrying different transport blocks consecutively in time domain. In some extreme cases, the UE receives the PDSCHs in consecutive slots. For such applications, if a network follows Rel.15 or Rel.16 specifications, the network needs to spend many DCIs in order to schedule these PDSCH transmissions. Obviously, it could consume a lot of signaling overhead.

Therefore, there is a need for an apparatus and a method of wireless communication, which can solve issues in the prior art, reduce a signaling overhead, provide a method for multiple PDSCH scheduling, provide a good communication performance, and/or provide high reliability.

SUMMARY

An object of the present disclosure is to propose an apparatus (such as a user equipment (UE) and/or a base station) and a method of wireless communication, which can solve issues in the prior art, reduce a signaling overhead, provide a method for multiple PDSCH scheduling, provide a good communication performance, and/or provide high reliability.

In a first aspect of the present disclosure, a method of wireless communication by a user equipment (UE) comprises being configured, by a base station, with a downlink control information (DCI) scheduling physical downlink shared channels (PDSCHs) and indicating a number of the PDSCHs.

In a second aspect of the present disclosure, a method of wireless communication by a base station comprises configuring, to a user equipment (UE), a downlink control information (DCI) scheduling physical downlink shared channels (PDSCHs) and indicating a number of the PDSCHs.

In a third aspect of the present disclosure, a user equipment (UE) comprises a memory, a transceiver, and a processor coupled to the memory and the transceiver. The processor is configured, by a base station, with a downlink control information (DCI) scheduling physical downlink shared channels (PDSCHs) and indicating a number of the PDSCHs.

In a fourth aspect of the present disclosure, a base station comprises a memory, a transceiver, and a processor coupled to the memory and the transceiver. The processor is configured to configure, to a user equipment, a downlink control information (DCI) scheduling physical downlink shared channels (PDSCHs) and indicating a number of the PDSCHs.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

For uplink transmissions or downlink transmissions in a shared spectrum, a user equipment (UE) or a gNB may perform a channel access procedure before transmitting one or more uplink transmissions or one or more downlink transmissions in a channel. The channel access procedure comprises sensing a channel to determine whether the channel is idle or busy. Optionally, a channel access procedure may comprise at least a type 1 channel access according to section 4.2.1.1 of TS37.213, or a type 2A channel access according to section 4.2.1.2.1 of TS37.213, or a type 2B channel access according to section 4.2.1.2.2 of TS37.213, or a type 2C channel access according to section 4.2.1.2.3 of TS37.213.

Figure 1:
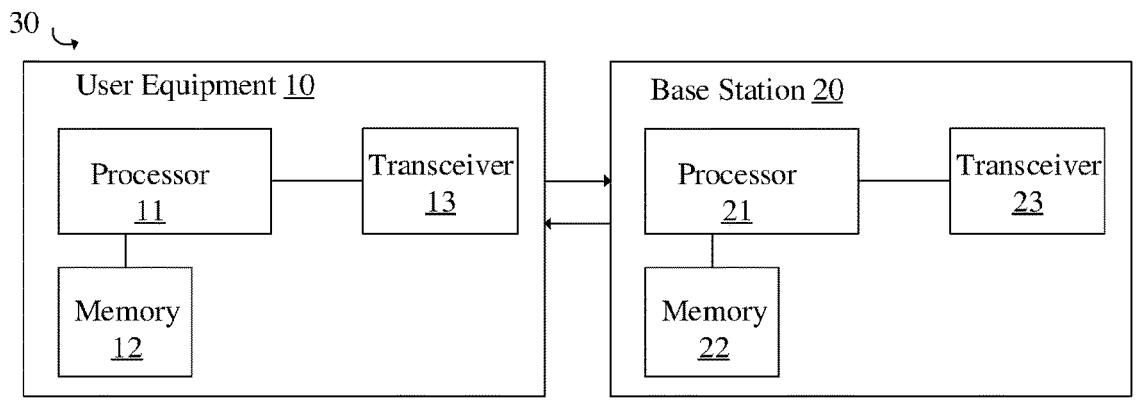
FIG. 1 is a block diagram of one or more user equipments (UEs) and a base station (e.g., gNB) of communication in a communication network system according to an embodiment of the present disclosure.

FIG. 1 illustrates that, in some embodiments, one or more user equipments (UEs) 10 and a base station (e.g., gNB) 20 for transmission adjustment in a communication network system 30 according to an embodiment of the present disclosure are provided. The communication network system 30 includes the one or more UEs 10 and the base station 20. The one or more UEs 10 may include a memory 12, a transceiver 13, and a processor 11 coupled to the memory 12 and the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured, by the base station 20, with a downlink control information (DCI) scheduling physical downlink shared channels (PDSCHs) and indicating a number of the PDSCHs. This can solve issues in the prior art, reduce a signaling overhead, provide a method for PUCCH slot determination for the multiple PDSCH scheduling, provide a good communication performance, and/or provide high reliability.

In some embodiments, the processor 21 is configured to configure, to a UE, a downlink control information (DCI) scheduling physical downlink shared channels (PDSCHs) and indicating a number of the PDSCHs. This can solve issues in the prior art, reduce a signaling overhead, provide a method for multiple PDSCH scheduling, provide a good communication performance, and/or provide high reliability.

Figure 2:
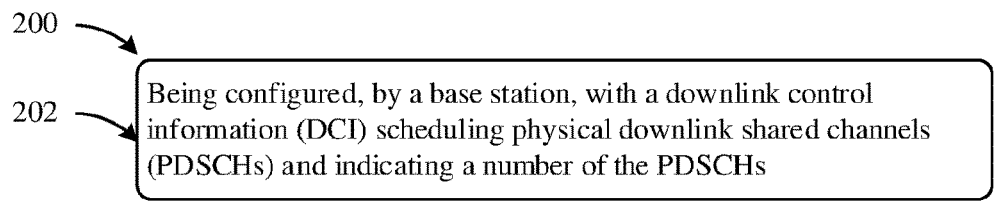
FIG. 2 is a flowchart illustrating a method of wireless communication performed by a user equipment (UE) according to an embodiment of the present disclosure.

FIG. 2 illustrates a method 200 of wireless communication by a user equipment (UE) according to an embodiment of the present disclosure. In some embodiments, the method 200 includes: a block 202, being configured, by a base station, with a downlink control information (DCI) scheduling physical downlink shared channels (PDSCHs) and indicating a number of the PDSCHs. This can solve issues in the prior art, reduce a signaling overhead, provide a method for multiple PDSCH scheduling, provide a good communication performance, and/or provide high reliability.

Figure 3:
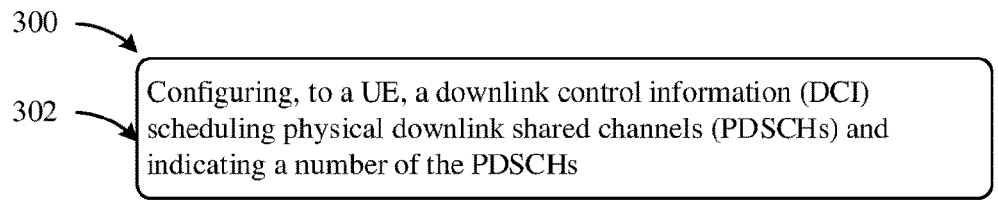
FIG. 3 is a flowchart illustrating a method of wireless communication performed by a base station according to an embodiment of the present disclosure.

FIG. 3 illustrates a method 300 of wireless communication by a base station according to an embodiment of the present disclosure. In some embodiments, the method 300 includes: a block 302, configuring, to a UE, a downlink control information (DCI) scheduling physical downlink shared channels (PDSCHs) and indicating a number of the PDSCHs. This can solve issues in the prior art, reduce a signaling overhead, provide a method for multiple PDSCH scheduling, provide a good communication performance, and/or provide high reliability.

In some embodiments, the DCI comprises a first indication field used to indicating the number of the PDSCHs. In some embodiments, the DCI comprises a time domain resource allocation, and the time domain resource allocation is indicated individually for one or more PDSCHs. In some embodiments, the DCI comprises a time domain resource allocation, and the time domain resource allocation is indicated for a first PDSCH of one or more PDSCHs. In some embodiments, the first PDSCH comprises an earliest PDSCH among the one or more PDSCHs. In some embodiments, the first indication field indicates a row index of a table, and the table comprises one or more rows. In some embodiments, a row of the table comprises one or more values, and the value of the table is used to indicate the time domain resource allocation for a PDSCH of the one or more PDSCHs. In some embodiments, a number of the one of more values of the table is equal to the number of the one or more PDSCHs. In some embodiments, the first indication field comprises a time domain resource allocation field. In some embodiments, the DCI comprises a second indication field, and the second indication field is used to indicate a timing. In some embodiments, the timing comprises a PDSCH-to-hybrid automatic repeat request (HARQ) feedback timing.

In some embodiments, the timing comprises an amount of slots between a first slot and a second slot. In some embodiments, the first slot is used to transmit a second PDSCH of the one or more PDSCHs. In some embodiments, the second PDSCH comprises a last PDSCH among the one or more PDSCHs. In some embodiments, the second slot comprises a slot in which the UE reports a HARQ-acknowledgment (ACK) information corresponding to at least a PDSCH of the one or more PDSCHs. In some embodiments, the UE is configured to report the HARQ-ACK information in a physical uplink control channel (PUCCH). In some embodiments, a resource of the PUCCH is in the second slot. In some embodiments, the timing meets a first condition, and the first condition comprises a time duration larger than or equal to a reference duration. In some embodiments, the time duration comprises a duration between a reference PDSCH and the PUCCH. In some embodiments, the reference PDSCH comprises a PDSCH of the one or more PDSCHs. In some embodiments, the reference PDSCH comprises a last PDSCH of the one or more PDSCHs.

In some embodiments, the time duration is a duration after a last symbol of the reference PDSCH and before a first symbol of the PUCCH. In some embodiments, the reference duration is relevant to processing time. In some embodiments, the reference duration is relevant to a subcarrier spacing. In some embodiments, the reference duration is pre-defined and/or configured. In some embodiments, the reference duration is relevant to a UE capability. In some embodiments, the reference duration comprises at least two values corresponding to two UE capabilities. In some embodiments, when the timing does not meet the first condition, the UE does not report the HARQ-ACK information in the PUCCH. In some embodiments, the UE is configured to report the HARQ-ACK information corresponding to a first set of PDSCHs of the one or more PDSCHs, and the first set of PDSCHs meets the first condition. In some embodiments, the UE drops a reception for a second set of PDSCHs of the one or more PDSCHs, where the second set of PDSCHs does not meet the first condition. In some embodiments, the UE assumes that the PDSCH-to-HARQ feedback timing for the second set of PDSCHs is an inapplicable value.

In some embodiments, the inapplicable value comprises −1. In some embodiments, the DCI comprises at least one of the followings: a DCI format 1_0, a DCI format 1_1, or a DCI format 1_2. In some embodiments, the PDSCHs correspond to different HARQ process numbers. In some embodiments, the table is radio resource control (RRC) configured by the base station. In some embodiments, the one of more values of the table comprises one or more starting and length indicator value (SLIV) values. In some embodiments, each time domain resource of the PDSCH is indicated by a corresponding SLIV value following an ordering. In some embodiments, the ordering is pre-defined or configured. In some embodiments, the table configures an additional column for the number of PDSCHs, and one SLIV value is indicated for each row. In some embodiments, if a row index number is indicated, the UE determines a number of scheduled PDSCHs. In some embodiments, the SLIV value is used for all the PDSCHs. In some embodiments, the SLIV value is used for the first PDSCH of the PDSCHs. In some embodiments, the DCI indicates a HARQ process number for a PDSCH.

In some embodiments, the HARQ process numbers for the other PDSCHs are derived from the PDSCH with indicated HARQ process numbers. In some embodiments, the DCI indicates individual redundancy version (RV) values for the PDSCHs. In some embodiments, the DCI uses 1 bit to indicate a RV value for an individual PDSCH, and the DCI schedules more than one PDSCH. In some embodiments, if the DCI schedules two PDSCHs, the DCI uses 2 bits for RV indication, and each bit corresponds to a PDSCH. In some embodiments, when the DCI schedules 1 PDSCH, the DCI uses 2-bit to indicate a RV value for the PDSCH. In some embodiments, when the DCI uses 1-bit to indicate a RV value, a first value of the bit is used to indicate the RV value equal to 0. In some embodiments, when the DCI uses 1-bit to indicate the RV value, a second value of the bit is used to indicate the RV value equal to 1, 2, or 3. In some embodiments, when the DCI contains an indication field corresponding to PDSCH group, and when the DCI schedules a set of PDSCHs, the indicated PDSCH group is applied for the set of PDSCHs. In some embodiments, the DCI individually indicates a PDSCH group for individual PDSCH of the set of PDSCHs.

In some embodiments, the method of PDSCH scheduling for a new radio (NR) system comprises a network that may schedule one or more PDSCH transmission by a same DCI format. In some embodiments, the number of the PDSCHs scheduled by the DCI format is indicated by a first indication field in the DCI format. In some embodiments, the time domain resource allocation is indicated individually for the one or more PDSCHs. In some embodiments, the time domain resource allocation is indicated for a first PDSCH of the one or more PDSCHs. In some embodiments, the first PDSCH comprises an earliest PDSCH among the one or more PDSCHs. In some embodiments, the first indication field indicates a row index of a table, wherein the table comprises one or more rows. In some embodiments, a row of the table comprises one or more values, wherein a value is used to indicate a time domain resource allocation for a PDSCH of the one or more PDSCHs. In some embodiments, a number of the one of more values is equal to a number of the one or more PDSCHs. In some embodiments, the first indication field comprises time domain resource allocation field. In some embodiments, the DCI format comprises a second indication field, wherein the second indication field is used to indicate a timing.

In some embodiments, the timing comprises a PDSCH-to-HARQ_feedback timing. In some embodiments, the timing comprises an amount of slots between a first slot and a second slot. In some embodiments, the first slot is used to transmit a second PDSCH of the one or more PDSCHs. In some embodiments, the second PDSCH comprises a last PDSCH. In some embodiments, the second slot comprises a slot in which the UE reports a HARQ-ACK information corresponding to at least a PDSCH of the one or more PDSCHs. In some embodiments, the UE reports the HARQ-ACK information in a PUCCH. In some embodiments, a resource of the PUCCH is in the second slot. In some embodiments, the timing meets a first condition, where the first condition comprises that a time duration is larger or equal to a reference duration. In some embodiments, the time duration comprises a duration between a reference PDSCH and the PUCCH. In some embodiments, the reference PDSCH comprises a PDSCH of the one or more PDSCHs. In some embodiments, the reference PDSCH comprises a last PDSCH of the one or more PDSCHs. In some embodiments, the time duration is a duration after a last symbol of the reference PDSCH and before a first symbol of the PUCCH. In some embodiments, the reference duration is relevant to processing time.

In some embodiments, the reference duration is relevant to a subcarrier spacing. In some embodiments, the reference duration is pre-defined and/or configured. In some embodiments, the reference duration is relevant to UE capability, wherein the reference duration comprises at least two values corresponding to two UE capabilities. In some embodiments, when the timing does not meet the first condition, the UE does not report HARQ-ACK information in the PUCCH. In some embodiments, the UE reports the HARQ-ACK information corresponding to a first set of PDSCHs of the one or more PDSCHs, wherein the first set of PDSCHs meet the first condition. In some embodiments, the UE drops the reception for a second set of PDSCHs of the one or more PDSCHs, where the second set of PDSCHs does not meet the first condition. In some embodiments, the UE may assume the PDSCH-to-HARQ_feedback timing for the second set of PDSCHs is an inapplicable value. In some embodiments, the inapplicable value comprises −1. In some embodiments, the DCI format comprises at least one of the followings: a DCI format 1_0, a DCI format 1_1, or a DCI format 1_2.

EXAMPLE

A network sends a DCI, which contains a DCI format, e.g., DCI format 1_1. The DCI format schedules a set of PDSCHs, where the set of PUSCHs correspond to different HARQ process numbers. In the DCI format, there is a first indication field, e.g., time domain resource allocation, and it indicates a row index of a table 1. The table is RRC configured by the network. In the table 1, it contains a set of rows, in some examples, it contains 4 rows. Each row points to a set of SLIV values, the SLIV value is used to determine a time domain resource for a PDSCH. If the row contains N SLIV values, it implies that the DCI schedules N PDSCHs. In some examples, it is assumed that the first indication field indicates row index 3, thus, the row contains 4 SLIV values, and the DCI schedules 4 PDSCHs. Each PDSCH time domain resource is indicated by the corresponding SLIV value following a given ordering.

TABLE 1 an example of time domain resource allocation table

| Row index 0 | SLIV value 1, SLIV value 2, SLIV value 3 |
| Row index 1 | SLIV value 1 |
| Row index 2 | SLIV value 1, SLIV value 2 |
| Row index 3 | SLIV value 1, SLIV value 2, SLIV value 3, SLIV value 4 |

Optionally, the table 1 can configure an additional column for the number of PDSCHs, and one SLIV value is indicated for each row as illustrated in a table 2. If the row index 3 is indicated, the UE determines the number of the scheduled PDSCH is 4. Optionally, the SLIV value is used for all the 4 PDSCHs. Optionally, the SLIV value is used for the first PDSCH of the 4 PDSCHs.

TABLE 2 an example of time domain resource allocation table

| Row index 0 | SLIV value | PDSCH number = 1 |
| Row index 1 | SLIV value | PDSCH number = 3 |
| Row index 2 | SLIV value | PDSCH number = 2 |
| Row index 3 | SLIV value | PDSCH number = 4 |

In some examples, the DCI indicates a HARQ process number for a PDSCH, and the HARQ process number for the other PDSCHs are derived from the PDSCH with indicated HARQ process number. In some examples, the DCI indicates individual redundancy version (RV) values for a set of PDSCHs. In some examples, the DCI uses 1 bit to indicate an RV value for individual PDSCH, which the DCI schedules more than one PDSCH, e.g., if the DCI schedules two PDSCHs, the DCI uses 2 bits for RV indication, and each bit corresponds to a PDSCH. Optionally, when the DCI schedules 1 PDSCH, the DCI uses 2-bit to indicate RV value for the PDSCH. Optionally, when the DCI uses 1-bit to indicate RV value, a first value of the bit is used to indicate RV value=0. Optionally, when the DCI uses 1-bit to indicate RV value, a second value of the bit is used to indicate RV value=1 or 2 or 3.

In some examples, when the DCI contains an indication field corresponding to PDSCH group, and when the DCI schedules a set of PDSCHs, the indicated PDSCH group is applied for the set of PDSCHs. Optionally, the DCI individually indicates a PDSCH group for individual PDSCH of the set of PDSCHs.

Figure 4:
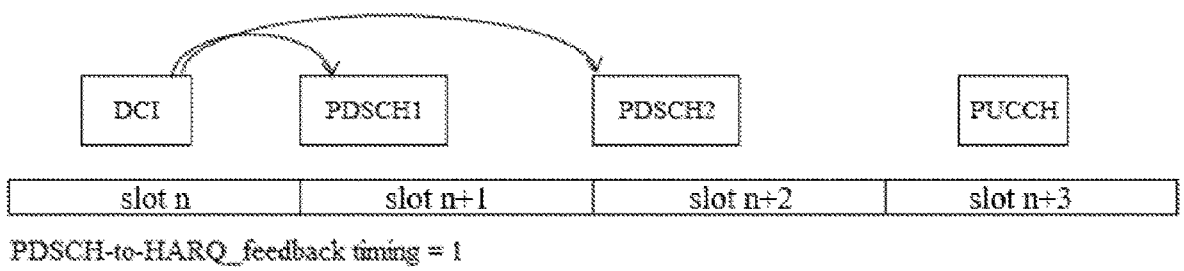
FIG. 4 illustrates an example that a DCI format schedules a set of PDSCHs in a set of slots according to an embodiment of the present disclosure.

FIG. 4 illustrates an example that a DCI format schedules a set of PDSCHs in a set of slots according to an embodiment of the present disclosure. In some examples, the DCI contains a second indication field wherein the second indication field is used to indicate a PDSCH-to-HARQ_feedback timing according to TS 38.213. In FIG. 4, a DCI schedules PDSCH1 and PDSCH2. The PDSCH-to-HARQ_feedback timing indicates the number of the slots between a reference slot and the slot in which a PUCCH is transmitted. The PUCCH is used for transmitting HARQ-ACK information corresponding to PDSCH 1 and/or PDSCH 2. The reference slot is the slot in which the PDSCH 2 is transmitted (slot n+2 in FIG. 4). Optionally, the reference slot is the slot in which the DCI is transmitted (slot n in FIG. 4).

Figure 5:
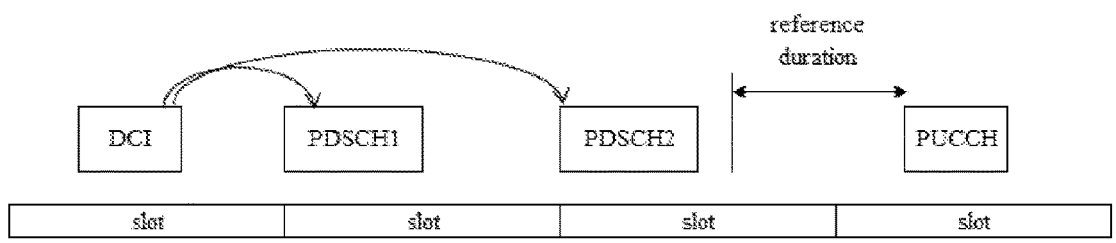
FIG. 5 illustrates an example that a DCI format schedules a set of PDSCHs in a set of slots according to an embodiment of the present disclosure.

FIG. 5 illustrates an example that a DCI format schedules a set of PDSCHs in a set of slots according to an embodiment of the present disclosure. In some examples, if PDSCH 1 and/or PDSCH 2 meet a processing time condition, the UE will report the HARQ-ACK information of PDSCH 1 and/or PDSCH 2 in the PUCCH transmission. The processing time condition is that the time duration between the last symbol of a PDSCH and the first symbol of the PUCCH is larger or equal to a reference duration. The reference duration may be pre-defined or configured or UE capability dependent. Optionally the reference duration may be calculated according to subcarrier spacing. In FIG. 5, both PDSCH1 and PDSCH 2 meet the processing time condition, the UE reports HARQ-ACK information of PDSCH 1 and PDSCH 2 in the PUCCH.

Figure 6:
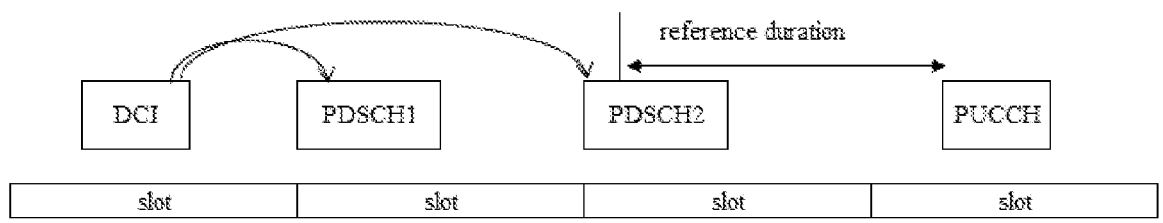
FIG. 6 illustrates an example that a DCI format schedules a set of PDSCHs in a set of slots according to an embodiment of the present disclosure.

FIG. 6 illustrates an example that a DCI format schedules a set of PDSCHs in a set of slots according to an embodiment of the present disclosure. In some examples as illustrated FIG. 6, PDSCH 1 meets the processing time condition but PDSCH2 does not meet. The UE reports HARQ-ACK information of PDSCH1 in the PUCCH. Optionally, the UE drops PDSCH2 reception. Optionally, the UE assumes the PDSCH-to-HARQ_feedback timing for PDSCH2 is an inapplicable value.

Commercial interests for some embodiments are as follows. 1. Solving issues in the prior art. 2. Reducing a signaling overhead. 3. Providing a method for multiple PDSCH scheduling. 4. Providing a good communication performance. 5. Providing a high reliability. 6. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

Figure 7:
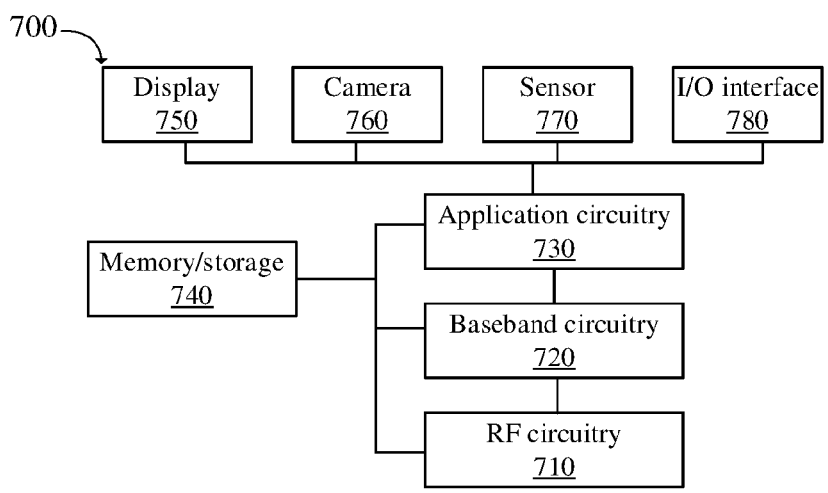
FIG. 7 is a block diagram of a system for wireless communication according to an embodiment of the present disclosure.

FIG. 7 is a block diagram of an example system 700 for wireless communication according to an embodiment of the present disclosure. Embodiments described herein may be implemented into the system using any suitably configured hardware and/or software. FIG. 7 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms. The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method, comprising:
    receiving, by user equipment (UE), from a base station, downlink control information (DCI) scheduling physical downlink shared channels (PDSCHs) and indicating a number of the PDSCHs, wherein the DCI comprises a first indication field indicating the number of the PDSCHs and a second indication field indicating a timing; and
    dropping, by the UE, reception of a PDSCH of the PDSCHs when a time duration corresponding to the timing is less than a reference duration, the time duration comprising a duration between a last symbol of the PDSCH of the PDSCHs and a first symbol of a physical uplink control channel (PUCCH) for reporting hybrid automatic repeat request (HARQ)-acknowledgment (ACK) information corresponding to at least a PDSCH of the PDSCHs, and the reference duration being configured.

2. The method of claim 1, wherein the DCI comprises a time domain resource allocation, and the time domain resource allocation is indicated individually for the PDSCHs; or,
    the DCI comprises a time domain resource allocation, and the time domain resource allocation is indicated for a first PDSCH of the PDSCHs, wherein the first PDSCH comprises an earliest PDSCH among the PDSCHs.

3. The method of claim 1, wherein the first indication field indicates a row index of a table, and the table comprises one or more rows,
    wherein a row of the table comprises one or more values, and a value of the table is used to indicate a time domain resource allocation for a PDSCH of the PDSCHs, and
    wherein a number of the one or more values of the table is equal to the number of the PDSCHs.

4. The method of claim 1,
    wherein the timing comprises at least one of:
    a PDSCH-to-HARQ feedback timing, or
    an amount of slots between a first slot and a second slot, wherein the first slot is used to transmit a second PDSCH of the PDSCHs, the second PDSCH comprises a last PDSCH among the PDSCHs, and/or, wherein the second slot comprises a slot in which the UE reports the HARQ-ACK information.

5. The method of claim 1, further comprising:
    reporting, by the UE, no HARQ-ACK information in the PUCCH to the base station when the time duration corresponding to the timing is less than the reference duration;
    reporting, by the UE, the HARA-ACK information in the PUCCH to the base station when the time duration corresponding to the timing is larger than the reference duration.

6. The method of claim 3, wherein at least one of the following applies:
    the one or more values of the table comprise one or more starting and length indicator value (SLIV) values;
    each time domain resource of the PDSCHs is indicated by a corresponding SLIV value following an ordering; or
    the table configures an additional column for the number of PDSCHs, and one SLIV value is indicated for each row.

7. The method of claim 1, wherein the DCI indicates a HARQ process number for a PDSCH, and HARQ process numbers for the other PDSCHs are derived from the PDSCH with the indicated HARQ process number.

8. The method of claim 1, wherein the DCI indicates individual redundancy version (RV) values for the PDSCHs, and
    wherein one of the following applies:
    the DCI uses 1 bit to indicate a RV value for an individual PDSCH, and the DCI schedules more than one PDSCH;
    if the DCI schedules two PDSCHs, the DCI uses 2 bits for RV indication, and each bit corresponds to a PDSCH;

when the DCI schedules 1 PDSCH, the DCI uses 2-bit to indicate a RV value for the PDSCH; or when the DCI uses 1-bit to indicate a RV value, a first value of the bit is used to indicate the RV value equal to 0, and when the DCI uses 1-bit to indicate the RV value, a second value of the bit is used to indicate the RV value equal to 1, 2, or 3.

9. A wireless communication method, comprising:
sending, by a base station, to user equipment (UE), downlink control information (DCI) scheduling physical downlink shared channels (PDSCHs) and indicating a number of the PDSCHs, wherein the DCI comprises a first indication field indicating the number of the PDSCHs and a second indication field indicating a timing,
wherein a time duration corresponding to the timing being less than a reference duration is used for triggering the UE to drop reception of a PDSCH of the PDSCHs, the time duration comprising a duration between a last symbol of the PDSCH of the PDSCHs and a first symbol of a physical uplink control channel (PUCCH) for reporting hybrid automatic repeat request (HARQ)-acknowledgment (ACK) information corresponding to at least a PDSCH of the PDSCHs, and the reference duration being configured.

10. The method of claim 9, wherein the DCI comprises a time domain resource allocation, and the time domain resource allocation is indicated individually for the PDSCHs; or,
the DCI comprises a time domain resource allocation, and the time domain resource allocation is indicated for a first PDSCH of the PDSCHs, wherein the first PDSCH comprises an earliest PDSCH among the PDSCHs.

11. The method of claim 9, wherein the first indication field indicates a row index of a table, and the table comprises one or more rows,
wherein a row of the table comprises one or more values, and a value of the table is used to indicate a time domain resource allocation for a PDSCH of the PDSCHs, and
wherein a number of the one of more values of the table is equal to the number of the PDSCHs.

12. The method of claim 9,
wherein the timing comprises at least one of:
a PDSCH-to-HARQ feedback timing, or
an amount of slots between a first slot and a second slot, wherein the first slot is used to transmit a second PDSCH of the PDSCHs, the second PDSCH comprises a last PDSCH among the PDSCHs, and/or, wherein the second slot comprises a slot in which the UE reports the HARQ-ACK information.

13. The method of claim 11, wherein the table configures an additional column for the number of PDSCHs, and one starting and length indicator value (SLIV) value is indicated for each row.

14. The method of claim 13, wherein if a row index number is indicated, the UE determines a number of scheduled PDSCHs.

15. The method of claim 9, wherein when the DCI contains an indication field corresponding to PDSCH group, and when the DCI schedules a set of PDSCHs, the indicated PDSCH group is applied for the set of PDSCHs.

16. User equipment (UE), comprising:
a memory;
a transceiver; and
a processor coupled to the memory and the transceiver;
wherein the processor is configured to perform the following operations comprising:
receiving, from a base station through the transceiver, downlink control information (DCI) scheduling physical downlink shared channels (PDSCHs) and indicating a number of the PDSCHs, wherein the DCI comprises a first indication field indicating the number of the PDSCHs and a second indication field indicating a timing; and
dropping reception of a PDSCH of the PDSCHs when a time duration corresponding to the timing is less than a reference duration, the time duration comprising a duration between a last symbol of the PDSCH of the PDSCHs and a first symbol of a physical uplink control channel (PUCCH) for reporting hybrid automatic repeat request (HARQ)-acknowledgment (ACK) information corresponding to at least a PDSCH of the PDSCHs, and the reference duration being configured.

17. A base station, comprising:
a memory;
a transceiver; and
a processor coupled to the memory and the transceiver;
wherein the processor is configured to cooperate with the transceiver to perform the method of claim 9.

18. The UE of claim 16, wherein the processor is further configured to perform the following operations comprising:
reporting no HARQ-ACK information in the PUCCH to the base station when the time duration corresponding to the timing is less than the reference duration;
reporting the HARA-ACK information in the PUCCH to the base station when the time duration corresponding to the timing is larger than the reference duration.

19. The UE of claim 16, wherein the DCI comprises at least one of: a DCI format 1_1, or a DCI format 1_2.

20. The UE of claim 16, wherein the DCI indicates individual redundancy version (RV) values for the PDSCHs, and
wherein one of the following applies:
the DCI uses 1 bit to indicate a RV value for an individual PDSCH, and the DCI schedules more than one PDSCH;
if the DCI schedules two PDSCHs, the DCI uses 2 bits for RV indication, and each bit corresponds to a PDSCH; or
when the DCI uses 1-bit to indicate a RV value, a first value of the bit is used to indicate the RV value equal to 0, and when the DCI uses 1-bit to indicate the RV value, a second value of the bit is used to indicate the RV value equal to 1, 2, or 3.

* * * * *